United States Patent Office 3,825,527
Patented July 23, 1974

1

3,825,527
AZO DYE OF A 3-AMINOPHTHALIMIDE AND
CONTAINING CARBAMOYL MOIETIES
Guenther Ruider, Frankenthal, and Peter Dimroth, Ludwigshafen, Germany, assignors to Badische Anilin- & Soda-Fabrik Aktiengesellschaft, Ludwigshafen (Rhine), Germany
No Drawing. Filed Dec. 2, 1971, Ser. No. 204,315
Int. Cl. C09b 29/00, 29/20; D06p 1/44
U.S. Cl. 260—152         3 Claims

ABSTRACT OF THE DISCLOSURE

This invention is directed to monoazo pigments of the formula of

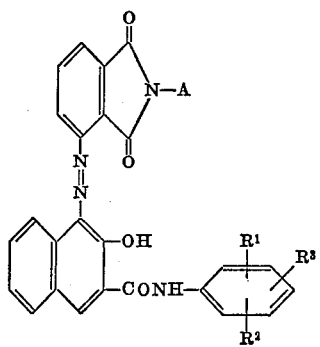
(1)

in which $R^1$ denotes carbamoyl among other possible constituents; $R^2$ and $R^3$ denote hydrogen or chlorine among other possible constituents; and A denotes phenyl among other constituents. The pigments generally have red shades and are eminently suitable for example for coloring lacquers, resins and printing inks.

The invention relates to dyes of the general formula (1)

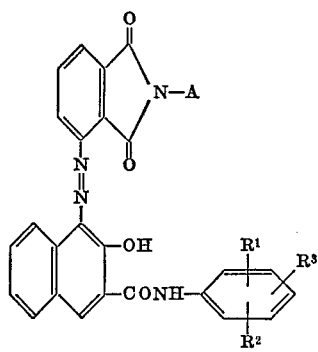
(1)

in which
$R^1$ denotes carbamoyl, carbamoyl bearing aryl as a substituent or amino bearing a C-acyl or a substituted C-acyl group as a substituent on the nitrogen atom;
$R^2$ denotes hydrogen, chlorine, bromine, alkoxy, cyano, carbomethoxy, methyl sulfonyl, carbamoyl or carbamoyl bearing aryl as a substituent;
$R^3$ denotes hydrogen, chlorine, methyl or alkoxy,
$R^1$ and $R^2$ together may denote the radical of the formula:

—C=O
|
N—B
|
—C=O

2

A denotes phenyl, naphthyl, diphenyl, fluorenyl or anthraquinonyl which may bear chloro, cyano, alkyl, alkoxy or carboalkoxy as a substituent; and
B denotes a hydrogen atom or aryl of one to three rings which may be substituted and may contain ring heteroatoms.

Alkoxy radicals for $R^2$, $R^3$ or A include for example methoxy and ethoxy. Alkyl and carboalkoxy radicals for A include for example methyl, ethyl, carbomethoxy and carboethoxy.

Examples of radicals B (other than hydrogen) are methyl, phenyl, or phenyl, naphthyl or anthraquinonyl bearing, as substituents, chlorine, bromine, methyl, ethyl, methoxy, ethoxy, phenoxy, chlorophenoxy, phenyl, benzoyl, cyano, carbomethoxy, carbamoyl, sulfonamido, acetylamino, benzoylamino, chlorobenzoylamino, methylbenzoylamino or nitro, and also the radicals having the formula:

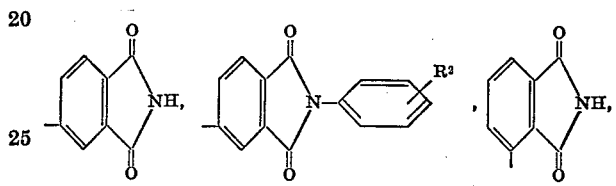

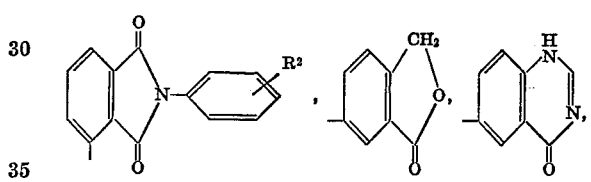

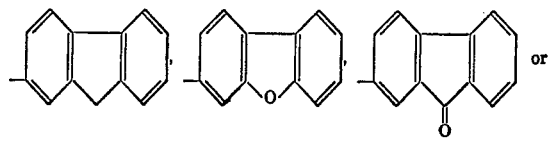

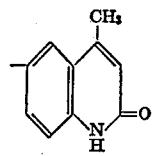

Preferred radicals B include for example phenyl, or phenyl or naphthyl bearing, as substituents, chloro, methyl, ethyl, methoxy, ethoxy, phenyl, carbomethoxy, carbamoyl, sulfonamido, acetylamino, benzoylamino or methylbenzoylamino.

$R^2$ has the meanings given above.
Examples of radicals $R^1$ are:

$CONH_2$, $CONHCONH_2$, $CONHC_6H_5$, $CONHC_6H_4Cl$ (o,m,p), $CONHC_6H_4CH_3$ (o,m,p), $CONHC_6H_4OCH_3$ (o,m,p), $CONHC_6C_4Br$ (o,m,p), $CONHC_6H_4SO_2NH_2$ (o,m,p), $CONHC_6H_3Cl_2$ (2,4; 3,4; 2,5; 3,5)

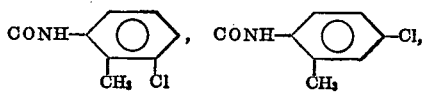

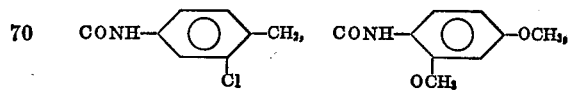

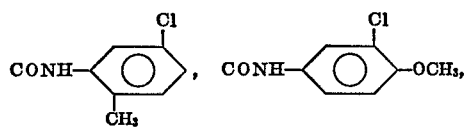

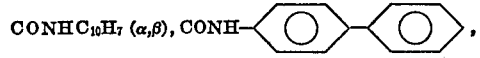

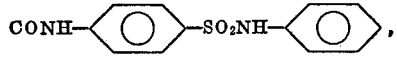

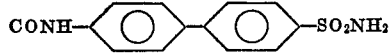

CONH—anthraquinonyl (α,β),
CONH—3—chloroanthraquinonyl-(β),
NHCO C₆H₅, NHCO C₆H₄Cl(o,m,p),
NHCO C₆H₃Cl₂(2,4; 2,5),
NHCO C₁₀H₇ (α,β), NHCO—anthraquinonyl,

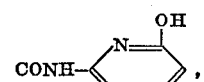

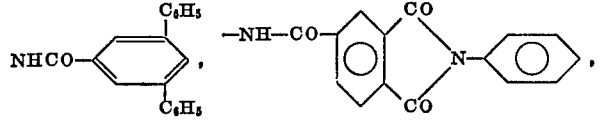

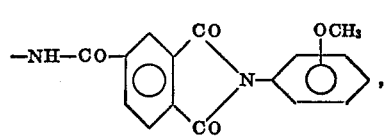

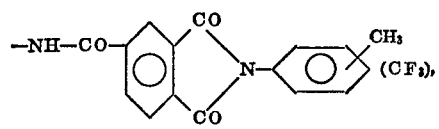

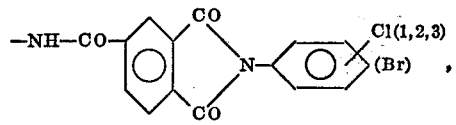

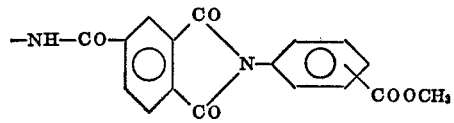

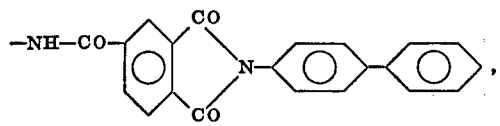

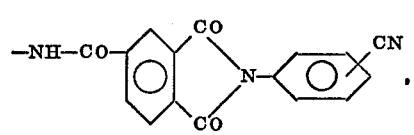

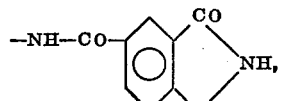

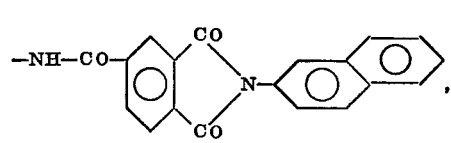

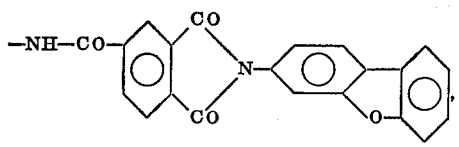

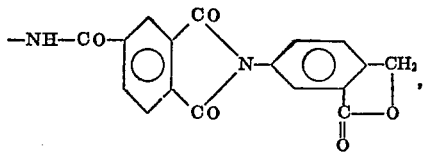

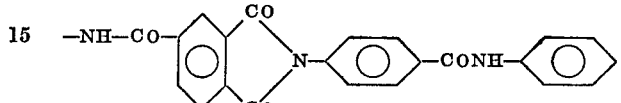

and

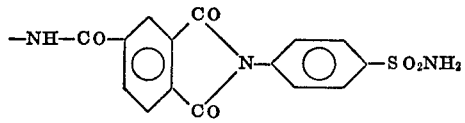

Preferred radicals R¹ have the formula:

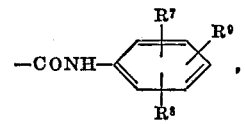

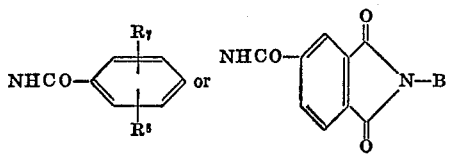

in which $R^7$ denotes hydrogen, fluoro, chloro, methyl, ethyl, methoxy, ethoxy, carbomethoxy, carbamoyl, sulfonamido, N-phenylsulfonamido or cyano;
$R^8$ denotes hydrogen, chloro, methyl, methoxy or ethoxy;
$R^9$ denotes hydrogen, chloro, methyl or methoxy; and
B has the above meanings.

N - phenylcarboxamide, N - chlorophenylcarboxamide, N-methylphenylcarboxamide, N-methoxyphenylcarboxamide and N-dichlorophenylcarboxamide are suitable as aryl-substituted carboxamides for $R^2$.

Dyes of the general formula (1a) are preferred:

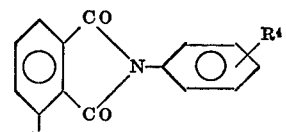

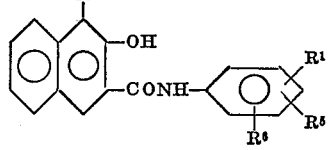

(1a)

in which $R^4$ denotes hydrogen, chloro, methyl, ethyl, methoxy ethoxy or phenyl;
$R^5$ denotes hydrogen, chloro, cyano, methyl or methoxy;

$R^6$ denotes hydrogen, chloro, methyl or methoxy; and $R^1$ and $R^5$ together may denote the radical of the formula:

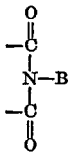

in which $R^1$ and B have the above meanings.

The radical of the said formula ($R^1+R^5$) is preferably in the 3,4-position to the —CO—NH— group.

Another group of valuable pigments has the general formula (1b):

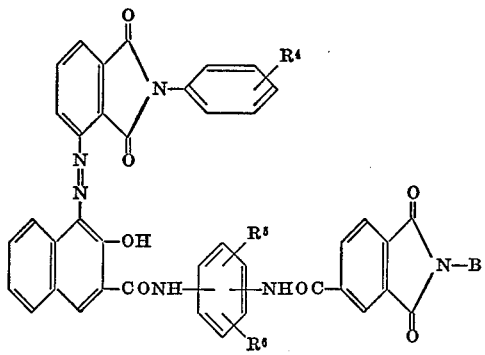

in which B, $R^4$, $R^5$ and $R^6$ have the above meanings.

For the production of the compounds of formula (1), a diazo compound of an amine of formula (2):

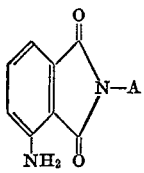

(2)

may be reacted with a coupling component of formula (3):

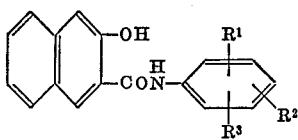

(3)

An azo compound of formula (4)

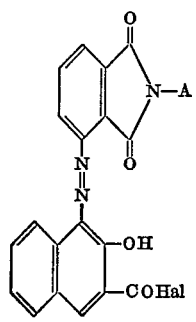

in which Hal denotes bromine or, preferably, chlorine may be condensed with an amine of the general formula (5)

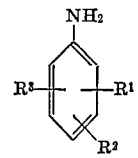

(5)

The compounds of formula (4) may be prepared by reaction of the diazo compound of an amine of formula (2) with β-hydroxynaphthoic acid followed by halogenation.

Examples of compounds of formula (2) are:

N-phenyl-3-aminophthalimide,
N-2'-chlorophenyl-3-aminophthalimide,
N-3'-chlorophenyl-3-aminophthalimide,
N-4'-chlorophenyl-3-aminophthalimide,
N-2'-methylphenyl-3-aminophthalimide,
N-3'-methylphenyl-3-aminophthalimide,
N-4'-methylphenyl-3-aminophthalimide,
N-2'-methoxyphenyl-3-aminophthalimide,
N-3'-methoxyphenyl-3-aminophthalimide,
N-4'-methoxyphenyl-3-aminophthalimide,
N-2'-carbomethoxyphenyl-3-aminophthalimide,
N-3'-carbomethoxyphenyl-3-aminophthalimide,
N-4'-carbomethoxyphenyl-3-aminophthalimide,
N-2',4'-dichlorophenyl-3-aminophthalimide,
N-2',5'-dichlorophenyl-3-aminophthalimide,
N-3',4'-dichlorophenyl-3-aminophthalimide,
N-2',5'-dicarbomethoxyphenyl-3-aminophthalimide,
N-2',4'-dimethylphenyl-3-aminophthalimide,
N-2',5'-dimethylphenyl-3-aminophthalimide,
N-3',4'-dimethylphenyl-3-aminophthalimide,
N-3'-chloro-4'-methylphenyl-3-aminophthalimide,
N-4'-chloro-3'-carbomethoxyphenyl-3-aminophthalimide,
N-2'-chloro-4'-methoxyphenyl-3-aminophthalimide,
N-β-naphthyl-3-aminophthalimide,
N-(4'-phenyl)-phenyl-3-aminophthalimide,
N-3'-fluorenyl-3-aminophthalimide, or
N-β-anthraquinonyl-3-aminophthalimide.

The following are suitable amines of the formula (5):

3-benzoylaminoaniline,
4-benzoylaminoaniline,
3-chlorobenzoylaminoaniline,
4-chlorobenzoylaminoaniline,
3-dichlorobenzoylaminoaniline,
4-dichlorobenzoylaminoaniline,
3-chloromethoxybenzoylaminoaniline,
4-chloromethoxybenzoylaminoaniline,
3-methoxybenzoylaminoaniline,
4-methoxybenzoylaminoaniline,
3-methylbenzoylaminoaniline,
4-methylbenzoylaminoaniline,
3-α-naphthoylaminoaniline,
4-α-naphthoylaminoaniline,
3-β-naphthoylaminoaniline,
4-β-naphthoylaminoaniline,
3-β-anthraquinonocarbonylaminoaniline,
4-β-anthraquinonocarbonylaminoaniline,
3-trichlorobenzoylaminoaniline,
4-trichlorobenzoylaminoaniline,
3-methoxy-4-benzoylaminoaniline,
3-methoxy-4-β-naphthoylaminoaniline,
3-methoxy-4-dichlorobenzoylaminoaniline,
3-methyl-4-benzoylaminoaniline,
3-methyl-4-β-naphthoylaminoaniline, 2-methoxy-4-benzoylaminoaniline,
2-methoxy-4-trichlorobenzoylaminoaniline,
2-methoxy-4-β-naphthoylaminoaniline,
2-methoxy-5-chloro-4-benzoylaminoaniline,
2-methoxy-5-chloro-4-β-naphthoylaminoaniline
2-methyl-4-benzoylaminoaniline,
2-methyl-4-β-naphthoylaminoaniline,
2-methyl-4-chloro-5-benzoylaminoaniline,
3-aminobenzoic acid chloroanilide,
4-aminobenzoic acid chloroanilide,
3-aminobenzanilide,
4-aminobenzanilide,
3-aminobenzodichloroanilide,
4-aminobenzodichloroanilide,
3-aminobenzo-β-naphthylamide,
4-aminobenzo-β-naphthylamide,
3-aminobenzoyl-α-aminoanthraquinone,
4-aminobenzoyl-α-aminoanthraquinone,
3-aminobenzotrichloroanilide,
4-aminobenzotrichloroanilide,
3'-aminobenzoyl-4-aminodiphenyl,
4'-aminobenzoyl-4-aminodiphenyl,
N-phenyl-4-aminophthalimide,
4-aminophthalimide,
N-(4'-chloro)-phenyl-4-aminophthalimide,
N-(2'-chloro)-phenyl-4-aminophthalimide,
N-(2',4'-dichloro)-phenyl-4-aminophthalimide,
N-(2'-carboxymethyl)-phenyl-4-aminophthalimide,
N-(4'-methoxy)-phenyl-4-aminophthalimide,
N-phenyl-3-aminophthalimide, and
3-aminophthalimide.

Compounds of formula (4) are obtained by conventional methods from the appropriate carboxylic acid by reaction with halogenating agents such as $POCl_3$, $SOCl_2$ or $COCl_2$, preferably in an inert solvent such as nitrobenzene, a halobenzene or a xylene with the addition of a catalytic amount of dimethylformamide or pyridine.

Condensation of the azocarboxylic chlorides or bromides of formula (4) with the amines of formula (5) is advantageously carried out by heating in organic solvents such as o-dichlorobenzene, nitrobenzene, methyl benzoate, xylene, dimethylformamide or N-methylpyrrolidone, and acid-binding agents or a catalytic amount of a compound such as collidine or N-methylpyrrolidone may be added which accelerate the reaction at temperatures of more than 100° C.

The coupling component of formula (3) may be prepared for example by condensation of 2-hydroxynaphthalene-3-carboxylic acid chloride with an amine of formula (5) or by condensation of 2-hydroxynaphthoic acid (3) with an amine of formula (5) in the presence of a chlorinating agent such as $PCl_3$.

Coupling of the compounds of formula (3) is advantageously carried out by bringing the aqueous alkaline solution of the coupling component or a very finely divided suspension of the coupling component in water together with the acid diazo solution. A pH range of from 4 to 7 is adjusted (advantageously by adding a buffer such as sodium acetate) and the addition of wetting or dispersing agents, for example aralkyl sulfonates, makes for a uniform course of the reaction. The new dyes may also be prepared by the modified process of French Pat. No. 1,537,423.

The pigments of the invention are obtained in this way in a very pure chemical condition but occasionally not in the optimum physical form for all applications. They may be brought into the form adapted to the particular application by conventional measures such as size reduction, salt grinding or recrystallization.

The new pigments may be used for dope dyeing for example of viscose, for the production of colored print pastes for book or offset printing, for the production of colored surface coatings, for example nitrocellulose lacquers, acrylate lacquers, melamine resin lacquers or alkyd resins, for dyeing phenoplasts or aminoplasts or thermoplastics such as polystyrene, polyolefins or polyvinyl chloride, rubber or silicone resins, for dyeing laminate papers or boards and for textile printing.

The new pigments are particularly suitable for dyeing polyvinyl chloride, polyethylene or polypropylene and in coating compositions and high grade printing inks.

The following Examples illustrate the invention. Unless otherwise stated the parts and percentages are by weight; the temperatures are given in degrees C.

EXAMPLE 1

288 parts of the dye obtained by coupling diazotized N-phenyl-3-aminophthalimide with 2-hydroxynaphthoic acid-3 is heated with 2600 parts of o-dichlorobenzene, 260 parts of thionyl chloride and 8 parts of dimethylformamide at 110° to 120° while stirring for five hours.

After the reaction mixture has cooled, the uniformly crystalline azo dye monocarboxylic acid chloride is isolated by suction filtration, washed with 200 parts of o-dichlorobenzene, then with 1000 parts of benzene and then with 1000 parts of cyclohexane and dried at 80° at subatmospheric pressure. 266 parts of a red crystal powder is obtained.

Analysis.—Calculated: Cl=7.8%. Found: Cl=7.6%.

22.8 parts of the azo dye carboxylic acid chloride thus obtained is stirred into 800 parts of dry o-dichlorobenzene, then 12.7 parts of finely powdered 4-benzoylaminoaniline and 5 parts of dimethylformamide are added and the whole is then heated for five hours at 140° to 150°. After cooling the whole to 80° the deposited sparingly soluble pigment is suction filtered and washed with a little hot o-dichlorobenzene and then with cold methanol until the filtrate running away is clear. The pigment can be improved by boiling it up with methanol or another solvent for two hours or stirring it at room temperature, preferably with N-methylpyrrolidone. After the product has been dried at 80° at subatmospheric pressure, 22.0 parts of a red powder is obtained which is practically insoluble in the usual solvents. Polyvinyl chloride film and sheeting and lacquers are colored red shades having excellent fastness to light, migration and overcoating.

The pigment has the formula:

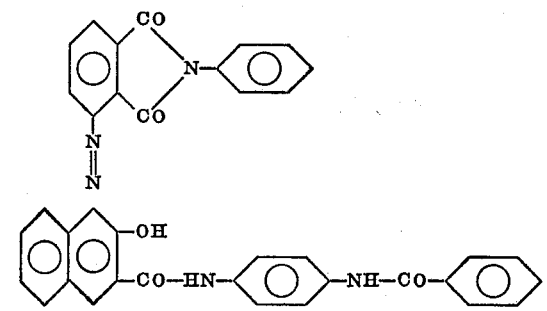

Analysis.—Calculated: N=11.1%. Found: N=11.3%.

Other monoazo pigments are obtained with the components in the following Table by coupling 1 mole of the diazo compound of the amine specified in column (I) onto 1 mole of 2-hydroxynaphthoic acid-(3), converting the resultant monoazo dye carboxylic acid into the acid chloride and condensing it with 1 mole of the amine specified in column (II).

Column (III) indicates the shade of a lacquer coating prepared from the pigment obtained.

| | I | II | III |
|---|---|---|---|
| Example: | | | |
| 2 | 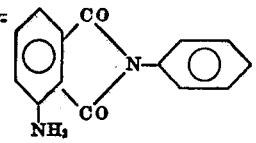 | 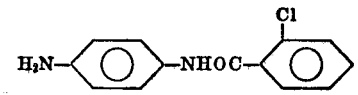 | Yellowish red. |
| 3 | Same as above | 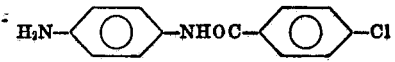 | Red. |
| 4 | do | 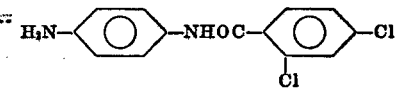 | Red. |
| 5 | do | 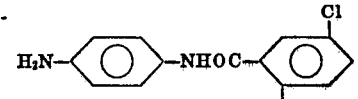 | Red. |
| 6 | do | 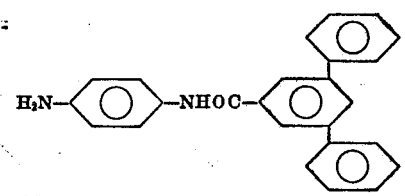 | Red. |
| 7 | do | 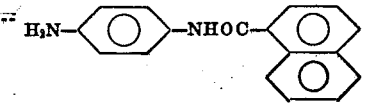 | Red. |
| 8 | do | 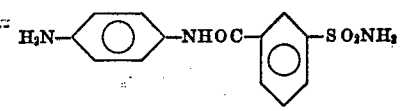 | Red. |
| 9 | do |  | Red. |
| 10 | do | 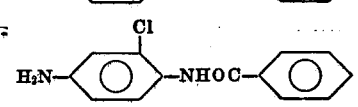 | Red. |
| 11 | do | 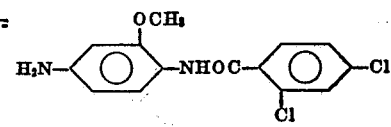 | Brown. |
| 12 | do | 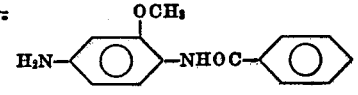 | Bluish red. |
| 13 | do | 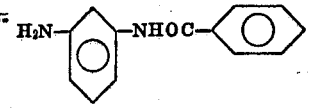 | Yellowish red. |
| 14 | do | 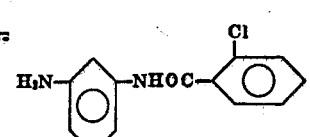 | Do. |
| 15 | do | 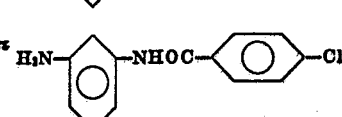 | Do. |
| 16 | do | 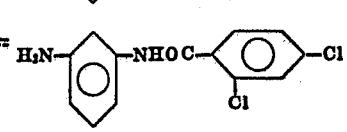 | Do. |

TABLE—Continued

| | I | II | III |
|---|---|---|---|
| Example: | | | |
| 17 | 3-aminophthalimide-N-phenyl (benzene ring with CO-N(phenyl)-CO and NH₂) | $H_2N$-(phenyl)-NHOC-(phenyl with 2,5-Cl₂) | Yellowish red. |
| 18 | Same as above | $H_2N$-(phenyl)-NHOC-(pyridine with 2,6-diphenyl) | Red. |
| 19 | do | $H_2N$-(phenyl)-NHOC-(phenyl)-$SO_2NH_2$ | Red. |
| 20 | do | $H_2N$-(phenyl)-NHOC-(naphthyl) | Red. |
| 21 | do | $H_2N$-(phenyl with $CH_3$)-NHOC-(phenyl) | Red. |
| 22 | do | $H_2N$-(phenyl with $OCH_3$)-NHOC-(phenyl) | Bluish red. |
| 23 | do | $H_2N$-(phenyl)-COHN-(phenyl) | Yellowish red. |
| 24 | do | $H_2N$-(phenyl)-COHN-(phenyl-Cl) | Do. |
| 25 | do | $H_2N$-(phenyl)-COHN-(phenyl)-Cl | Do. |
| 26 | do | $H_2N$-(phenyl)-COHN-(phenyl)-Cl with Cl | Orange red. |
| 27 | do | $H_2N$-(phenyl)-COHN-(phenyl with 3 Cl) | Red. |
| 28 | do | $H_2N$-(phenyl)-COHN-(phenyl with 2 Cl) | Bluish red. |
| 29 | do | $H_2N$-(phenyl)-COHN-(phenyl with 2 Cl) | Red. |
| 30 | do | $H_2N$-(phenyl)-COHN-(phenyl)-$CH_3$ | Red. |
| 31 | do | $H_2N$-(phenyl)-COHN-(phenyl with $CH_3$) | Red. |
| 32 | do | $H_2N$-(phenyl)-COHN-(phenyl with Cl) | Yellowish red. |

TABLE—Continued

| | I | II | III |
|---|---|---|---|
| Example: | | | |
| 33 | Same as Example 2 | H₂N—⌬—COHN—⌬(-CH₃)(-CH₃) | Red. |
| 34 | do | H₂N—⌬—COHN—⌬(-CH₃)(-Cl) | Red. |
| 35 | do | H₂N—⌬—COHN—⌬(-Cl)(-CH₃) | Yellowish red. |
| 36 | do | H₂N—⌬—COHN—⌬-OCH₃ | Red. |
| 37 | do | H₂N—⌬—COHN—⌬-OCH₃ | Red. |
| 38 | do | H₂N—⌬—COHN—⌬(-OCH₃)(-Cl) | Yellowish red. |
| 39 | do | H₂N—⌬—COHN—⌬(-Cl)(-OCH₃) | Red. |
| 40 | do | H₂N—⌬—COHN—⌬(-OCH₃)(-OCH₃) | Red. |
| 41 | do | H₂N—⌬—COHN—⌬-CN | Yellowish red. |
| 42 | do | H₂N—⌬—COHN—⌬(-Cl)(-CN) | Do. |
| 43 | do | H₂N—⌬—COHN—⌬-⌬ | Do. |
| 44 | do | H₂N—⌬—COHN—⌬(⌬) | Do. |
| 45 | do | H₂N—⌬—COHN—⌬—O—⌬ | Do. |
| 46 | do | H₂N—⌬—CO—HN—anthraquinonyl | Red. |
| 47 | do | H₂N—⌬—COHN—(Cl-anthraquinonyl) | Yellowish red. |
| 48 | do | H₂N—⌬—COHNCONH₂ | Do. |
| 49 | do | H₂N—⌬—CONH—⌬—SO₂NH₂ | Do. |

TABLE—Continued

| Example | I | II | III |
|---|---|---|---|
| 50 | Same as Example 2 | H₂N—⟨C₆H₄⟩—COHN—pyrimidine(OH, CH₃) | Yellowish red. |
| 51 | ...do... | H₂N—⟨C₆H₄⟩—COHN—dibenzofuranyl | Red. |
| 52 | ...do... | H₂N—⟨C₆H₄⟩—COHN—⟨C₆H₄⟩—C(O)—⟨C₆H₅⟩ | Yellowish red. |
| 53 | ...do... | H₂N—⟨C₆H₄⟩—COHN—⟨C₆H₄⟩—NHSO₂—⟨C₆H₅⟩ | Red. |
| 54 | ...do... | H₂N—⟨C₆H₄⟩—COHN—⟨C₆H₄⟩—CONH—⟨C₆H₅⟩ | Yellowish red. |
| 55 | ...do... | H₂N—⟨C₆H₄⟩—COHN—⟨C₆H₄⟩—CONH₂ | Red. |
| 56 | ...do... | H₂N—⟨C₆H₄⟩—COHN—⟨phthalide-CH₃⟩ | Red. |
| 57 | ...do... | H₂N—⟨C₆H₄⟩—COHN—⟨C₆H₃⟩(OCH₃)(CH₃) | Red. |
| 58 | ...do... | H₂N—⟨C₆H₄⟩—COHN—⟨C₆H₅⟩ | Yellowish red. |
| 59 | ...do... | H₂N—⟨C₆H₄⟩—COHN—⟨C₆H₃⟩(Cl)(Cl) | Bluish red. |
| 60 | ...do... | H₂N—⟨C₆H₄⟩—COHN—⟨C₆H₄⟩—OCH₃ | Red. |
| 61 | ...do... | H₂N—⟨C₆H₄⟩—COHN—⟨C₆H₄⟩—OCH₃ | Yellowish red. |
| 62 | ...do... | H₂N—⟨C₆H₄⟩—COHN—⟨C₆H₃⟩(Cl)(Cl) | Do. |
| 63 | ...do... | H₂N—⟨C₆H₄⟩—COHN—⟨C₆H₃⟩(Cl)(CH₃) | Do. |
| 64 | ...do... | H₂N—⟨C₆H₄⟩—COHN—⟨C₆H₄⟩—⟨C₆H₅⟩ | Do. |
| 65 | ...do... | H₂N—⟨C₆H₄⟩—COHN—⟨C₆H₄⟩—SO₂NH₂ | Red. |

TABLE—Continued
| I | II | III |
|---|---|---|
| Example: | | |
| 66.... Same as Example 2 | 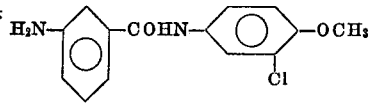 | Red. |
| 67.....do..... | 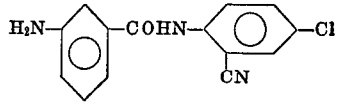 | Yellowish red. |
| 68.....do..... | 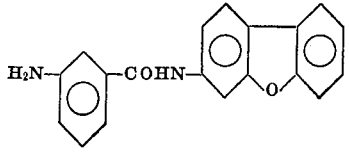 | Red. |
| 69.....do..... | 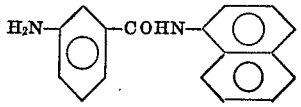 | Red. |
| 70.....do..... | 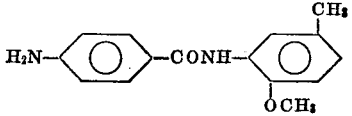 | Yellowish red. |
| 71.....do..... | 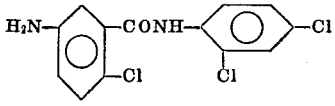 | Red. |
| 72.....do..... | 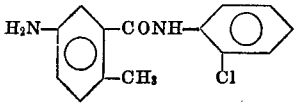 | Red. |
| 73.....do..... | 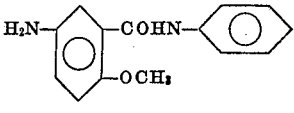 | Red. |
| 74.....do..... |  | Red. |
| 75.....do..... | 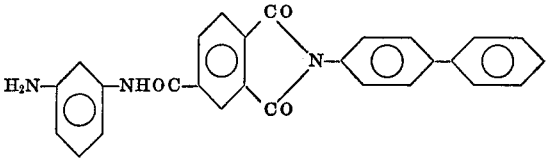 | Orange. |
| 76.....do..... | 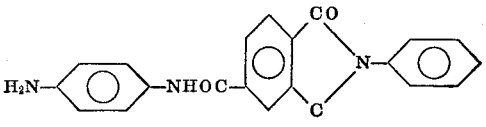 | Red. |
| 77.....do..... | 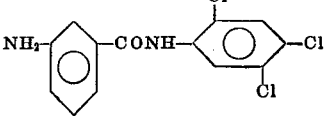 | Yellowish red. |
| 78.....do..... | 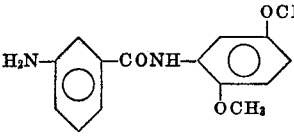 | Red. |
| 79.....do..... | 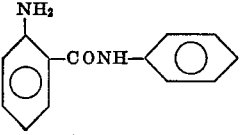 | Yellowish red. |

TABLE—Continued

| I | II | III |
|---|---|---|
| Example 80.... Same as Example 2 | H₂N-C₆H₃(CO)₂N-C₆H₅ | Yellowish red. |
| 81.....do..... | H₂N-C₆H₃(CO)₂N-C₆H₄-SO₂NH₂ | Red. |
| 82.....do..... | H₂N-C₆H₃(CO)(NH)(CO) | Bluish red. |
| 83.....do..... | H₂N-C₆H₃(CO)₂N-C₆H₃(CO)₂N-C₆H₅ | Do. |
| 84.....do..... | H₂N-C₆H₃(CO)₂N-C₆H₄-Cl (ortho) | Yellowish red. |
| 85.....do..... | H₂N-C₆H₃(CO)₂N-C₆H₄-Cl (para) | Red. |
| 86.....do..... | H₂N-C₆H₃(CO)₂N-C₆H₃-Cl₂ | Bluish red. |
| 87.....do..... | H₂N-C₆H₃(CO)₂N-C₆H₄-COOCH₃ | Red. |
| 88.....do..... | H₂N-C₆H₃(CO)₂N-C₆H₄-OCH₃ | Bluish red. |
| 89.....do..... | H₂N-C₆H₃(CO)₂N-C₆H₄-OCH₃ | Red. |
| 90.....do..... | H₂N-C₆H₃(CO)₂N-C₆H₄-CH₃ | Yellowish red. |
| 91.....do..... | H₂N-C₆H₃(CO)₂N-C₆H₄-C₆H₅ | Yellowish red. |
| 92.....do..... | H₂N-C₆H₃(CO)₂N-C₆H₃(CH₃)(Cl) | Yellowish red. |

| I | II | III |
|---|---|---|
| Example: | | |
| 93. Same as Example 2 | 4-amino-N-(2-chloro-4-methoxyphenyl)phthalimide | Red. |
| 94. do | 4-amino-N-(4-chloro-2-cyanophenyl)phthalimide | Yellowish red. |
| 95. do | 4-amino-N-(4-carbamoylphenyl)phthalimide | Red. |
| 96. do | 3-amino-N-phenylphthalimide | Orange red. |
| 97. do | 3-amino-N-[4-(4-chlorophenylcarbamoyl)phenyl]phthalimide | Orange. |
| 98. do | 4-amino-N-(4-methylphenyl)phthalimide | Yellowish red. |
| 99. do | 4-amino-N-(2,5-dichlorophenyl)phthalimide | Bluish red. |
| 100. 3-amino-N-(2-chlorophenyl)phthalimide | $H_2N-C_6H_4-CONHCONH_2$ | Yellowish red. |
| 101. Same as above | $H_2N-C_6H_4-NHOC-C_6H_3(Cl)_2$ (2,5-dichloro) | Red. |
| 102. do | 4-amino-N-phenylphthalimide | Yellowish red. |
| 103. do | 4-amino-N-phenylphthalimide | Bluish red. |
| 104. 3-amino-N-(4-chlorophenyl)phthalimide | $H_2N-C_6H_4-CONHCONH_2$ | Yellowish red. |

TABLE—Continued

| I | II | III |
|---|---|---|
| Example: 105 ....... Same as Example 104 | $H_2N-\bigcirc-NHCO-\bigcirc(Cl)(Cl)$ | Red. |
| 106 ....... do | $H_2N-\bigcirc-NHOC-\bigcirc\bigcirc$ (naphthyl) | Reddish brown. |
| 107 ....... do | $H_2N-\bigcirc-CONH-\bigcirc-SO_2NH_2$ | Yellowish red. |
| 108 ....... do | $H_2N-\bigcirc(CO)(CO)N-\bigcirc$ (phthalimide with phenyl) | Brownish red. |
| 109 ....... do | $H_2N-\bigcirc(CO)(CO)N-\bigcirc-(CO)(CO)N-\bigcirc$ | Red. |
| 110 ....... do | $H_2N-\bigcirc(CO)(CO)NH$ | Red. |
| 111 ....... $\bigcirc(CO)(CO)N-\bigcirc(Cl)(Cl)$ with $NH_2$ | $H_2N-\bigcirc(CO)(CO)N-\bigcirc$ | Red. |
| 112 ....... $\bigcirc(CO)(CO)N-\bigcirc(COOCH_3)$ with $NH_2$ | $H_2N-\bigcirc-CONHCONH_2$ | Yellowish red. |
| 113 ....... Same as above | $H_2N-\bigcirc-CONH-\bigcirc-SO_2NH_2$ | Red. |
| 114 ....... do | $H_2N-\bigcirc-NHOC-\bigcirc(Cl)(Cl)$ | Red. |
| 115 ....... do | $H_2N-\bigcirc(Cl)-NHOC-\bigcirc$ | Red. |
| 116 ....... do | $H_2N-\bigcirc-NHOC-\bigcirc$ | Yellowish red. |
| 117 ....... do | $H_2N-\bigcirc(CO)(CO)NH$ | Red. |
| 118 ....... do | $H_2N-\bigcirc(CO)(CO)N-\bigcirc-SO_2NH_2$ | Yellowish red. |

EXAMPLE 119

34.2 parts of the azo dye carboxylic acid chloride obtained according to Example 1 is stirred in 600 parts of N-methylpyrrolidone-(2), then 23.8 parts of finely powdered N-phenyl-4-aminophthalimide is added and the whole is heated for five hours at 140° to 150°. The sparingly soluble pigment thus precipitated in finely crystalline form is cooled to 80° and suction filtered, and washed with N-methylpyrrolidone-(2) and then with cold methanol until the filtrate running away is clear. The pigment can be improved by boiling it up for two hours in methanol or another solvent or stirring it at room temperature.

After drying at 80° at subatmospheric pressure 45.0 parts of a red powder is obtained which is practically insoluble in the usual solvents. Polyvinyl chloride film, sheeting and coating compositions are colored therewith red shades having excellent fastness to light, migration and overcoating.

The pigment has the formula:

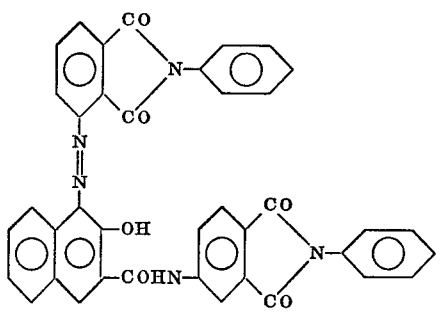

*Analysis.*—Calculated: $N=10.7\%$. Found: $N=10.6\%$.

Other monoazo pigments are obtained with the components in the following Table by coupling 1 mole of the diazo compound of the amines specified in column I with 1 mole of 2-hydroxynaphthoic acid-(3), converting the resultant monoazo dye carboxylic acid into its acid chloride and condensing this with 1 mole of the amine specified in column II.

Column III indicates the shade of a coating prepared with the pigment obtained.

cording to Example 1 is heated to about 80° in 1600 parts of dry o-dichlorobenzene. Then a hot solution of 29.6 parts of 3 - chloro - 4 - benzoylaminoaniline in 200 parts of N - methylpyrrolidone-(2) or dimethylformamide is added and the whole is heated for five hours at 140° to 150°.

The sparingly soluble pigment thus deposited in a finely crystalline form is cooled to 80°, suction filtered, and washed with a little o-dichlorobenzene or cold dimethylformamide or N - methylpyrrolidone-(2) and then with cold methanol until the filtrate running away is clear. The pigment may be improved by boiling it up with methanol or another solvent for another two hours or stirring it at room temperature.

After drying at 80° at subatmospheric pressure, 56.0 parts of a red powder is obtained which is practically insoluble in the usual solvents. Polyvinyl chloride film, sheeting and coating compositions are colored therewith red shades of excellent fastness to light, migration and overcoating.

The pigment has the formula:

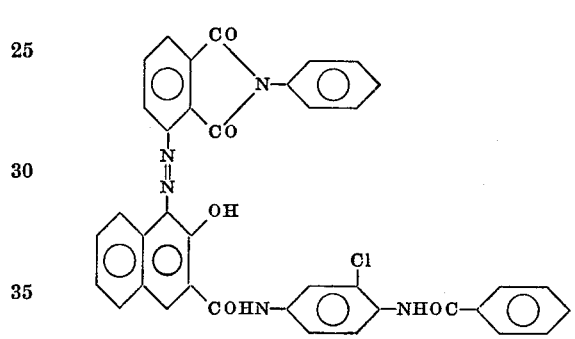

*Analysis.*—Calculated: $N=10.5\%$. Found: $N=10.7\%$.

Other monazo dyes are obtained with the components in the following Table by coupling 1 mole of the diazo compound of an amine specified in column I with 1 mole of hydroxynaphthoic acid-(3) and converting the monoazo dye carboxylic acid obtained into its acid chloride which is then condensed with 1 mole of an amine specified in column II.

| Example number: | I | II | III |
|---|---|---|---|
| 120 | (phthalimide-phenyl with NH₂) | H₂N—⟨ ⟩—NHCO—⟨ ⟩(Cl,Cl) | Red. |
| 121 | Same as above | H₂N—⟨ ⟩—NHOC—⟨ ⟩ | Red. |
| 122 | do | H₂N—⟨ ⟩—NHOC—⟨ ⟩(OCH₃) | Bluish red. |
| 123 | do | H₂N—⟨ ⟩—NHOC—⟨ ⟩(Cl) | Red. |

EXAMPLE 124

45.6 parts of the azo dye carboxylic acid chloride ac-

Column III indicates the shade of a coating prepared with the pigment obtained.

| Ex. | I | II | III |
|---|---|---|---|
| 125 | 3-aminophthalimide-N-phenyl | H₂N—⟨⟩—NHOC—⟨⟩ | Red. |
| 126 | Same as above | H₂N—⟨⟩(OCH₃)—NHOC—⟨⟩ | Bluish red. |
| 127 | do | H₂N—⟨⟩—NHOC—(pyridine with two phenyl substituents) | Red. |
| 128 | do | H₂N—⟨⟩—NHOC—(pyridine with two phenyl substituents) | Red. |
| 129 | do | H₂N—⟨⟩—COHN—⟨⟩(Cl,Cl) | Orange. |
| 130 | do | H₂N—⟨⟩—COHN—(naphthyl) | Red. |
| 131 | phthalimide-N-(naphthyl) | H₂N—⟨⟩—NHCO—⟨⟩ | Red. |
| 132 | 3-aminophthalimide-N-(fluorenyl) | Same as above | Red. |
| 133 | 3-aminophthalimide-N-(anthraquinonyl) | H₂N—⟨⟩—NHCO—⟨⟩ | Red. |
| 134 | 3-aminophthalimide-N-(biphenyl) | Same as above | Red. |
| 135 | 3-aminophthalimide-N-(phenoxyphenyl) | do | Red. |

TABLE—Continued

| Ex. | I | II | III |
|---|---|---|---|
| 136 | [structure: phthalimide-N-phenyl with NH2] | [structure: H2N-C6H4-NHOC-C6H3(CO)2N-C6H3Cl2] | Bluish red. |
| 137 | Same as above | [structure: H2N-C6H4-NHOC-C6H3(CO)2N-C6H3Cl2] | Brownish red. |
| 138 | do | [structure: H2N-C6H4-NHOC-C6H3(CO)2N-C6H4-OCH3] | Red. |
| 139 | do | [structure: H2N-C6H4-NHOC-C6H3(CO)2N-C6H4-OCH3] | Orange. |
| 140 | do | [structure: H2N-C6H4-NHOC-C6H3(CO)2N-naphthyl] | Red. |
| 141 | do | [structure: H2N-C6H4-NHOC-C6H3(CO)2N-naphthyl] | Red. |
| 142 | do | [structure: H2N-C6H4-NHOC-C6H3(CO)2N-anthraquinonyl] | Brownish rd. |
| 143 | do | [structure: H2N-C6H4-NHOC-C6H3(CO)2N-C6H4-COOCH3] | Bluish red. |
| 144 | do | [structure: H2N-C6H4-NHOC-C6H3(CO)2N-C6H4-COOCH3] | Brownish red. |
| 145 | do | [structure: H2N-C6H4-NHOC-C6H3(CO)2N-anthraquinonyl] | Red. |

TABLE—Continued

| Ex. | I | II | III |
|---|---|---|---|
| 146 | 3-aminophthalimide-N-phenyl structure (phthalimide with NH2 on benzene and N-phenyl) | H2N–C6H4–NHOC–[phthalimide]–N–C6H3(Cl)(OCH3) | Red. |
| 147 | Same as above | H2N–C6H4–NHOC–[phthalimide isomer]–N–C6H3(Cl)(OCH3) | Red. |
| 148 | do | H2N–C6H4–NHOC–[phthalimide]–N–C6H3(CH3)(OCH3) | Red. |
| 149 | do | H2N–C6H4–NHOC–[phthalimide isomer]–N–C6H3(CH3)(OCH3) | Red. |
| 150 | do | H2N–C6H4–NHOC–[phthalimide]–N–C6H3(Cl)(CH3) | Yellowish red. |
| 151 | do | H2N–C6H4–NHOC–[phthalimide]–N–C6H4–CH3 | Do. |
| 152 | do | H2N–C6H4–NHOC–[phthalimide]–N–C6H4–CH3 | Do. |
| 153 | do | H2N–C6H4–NHOC–[phthalimide]–N–C6H3(Cl)(Cl) | Do. |
| 154 | do | H2N–C6H4–NHOC–[phthalimide]–N–C6H3(Cl)(Cl) | Do. |
| 155 | do | H2N–C6H4–NHOC–[phthalimide]–N–C6H2(OCH3)(Cl)(Cl) | Red. |
| 156 | do | H2N–C6H4–NHOC–[phthalimide]–N–C6H2(Cl)(Cl)(COOCH3) | Yellowish red. |
| 157 | do | H2N–C6H4–NHOC–[phthalimide]–N–C6H4–SO2NH2 | Red. |

TABLE—Continued

| Ex. | I | II | III |
|---|---|---|---|
| 158 | Same as Example 136 | H₂N–⟨⟩–NHOC–⟨phthalimide⟩–N–⟨⟩–⟨⟩–SO₂NH₂ | Red. |
| 159 | do | H₂N–⟨⟩–NHOC–⟨phthalimide⟩–N–⟨⟩–SO₂NH–⟨⟩ | Red. |
| 160 | do | H₂N–⟨⟩–NHOC–⟨phthalimide⟩–N–⟨⟩–O–⟨⟩ | Red. |
| 161 | do | H₂N–⟨⟩–NHOC–⟨phthalimide⟩–N–⟨⟩–O–⟨⟩ | Red. |
| 162 | do | H₂N–⟨⟩–NHOC–⟨phthalimide⟩–N–⟨⟩–CO–⟨⟩ | Yellowish red. |
| 163 | do | H₂N–⟨⟩–NHOC–⟨phthalimide⟩–N–⟨dibenzofuran⟩ | Red. |
| 164 | do | H₂N–⟨⟩–NHOC–⟨phthalimide⟩–N–⟨dibenzofuran⟩ | Red. |
| 165 | do | H₂N–⟨⟩–NHOC–⟨phthalimide⟩–N–⟨⟩(CN) | Yellowish red. |
| 166 | do | H₂N–⟨⟩–NHOC–⟨phthalimide⟩–N–⟨⟩(CN)(Cl) | Do. |
| 167 | do | H₂N–⟨⟩–NHOC–⟨phthalimide⟩–N–⟨⟩(OCH₃)(OCH₃) | Red. |
| 168 | do | H₂N–⟨⟩–NHOC–⟨phthalimide⟩–N–⟨⟩–COOCH₃ | Yellowish red. |

TABLE—Continued

| Ex. | I | II | III |
|---|---|---|---|
| 169 | Same as Example 136 | (structure: H₂N–C₆H₄–NHOC–phthalimide-N–C₆H₄–OCH₃) | Red. |
| 170 | do | (structure: H₂N–C₆H₄–NHOC–phthalimide-N–C₆H₄–OCH₃, para) | Yellowish red. |
| 171 | do | (structure: H₂N–C₆H₄–NHOC–phthalimide-N–biphenyl) | Orange. |
| 172 | do | (structure: H₂N–C₆H₄–NHOC–phthalimide-N–biphenyl) | Yellowish red. |
| 173 | do | (structure: H₂N–C₆H₄–NHOC–phthalimide-N–C₆H₅) | Red. |
| 174 | do | (structure: H₂N–C₆H₃(Cl)–NHOC–phthalimide-N–C₆H₅) | Red. |
| 175 | do | (structure: H₂N–C₆H₃(OCH₃)–NHOC–phthalimide-N–C₆H₄–OCH₃) | Violet. |
| 176 | do | (structure: H₂N–C₆H₄–NHOC–phthalimide-N–phthalide) | Red. |
| 177 | (structure: 3-amino-N-(p-tolyl)phthalimide) | H₂N–C₆H₄–CONH–C₆H₅ | Red. |
| 178 | (structure: 3-amino-N-(o-tolyl)phthalimide) | H₂N–C₆H₄–phthalimide-N–C₆H₅ | Yellowish red. |
| 179 | (structure: 3-amino-N-(p-methoxyphenyl)phthalimide) | H₂N–C₆H₄–CONH–C₆H₃(Cl)₂ | Red. |

| Ex. No. | I | II | III |
|---|---|---|---|
| 180 | 3-amino-N-(2,4-dimethoxyphenyl)phthalimide | H₂N—C₆H₄—NHOC—(phthalimide-N-phenyl) | Red. |
| 181 | 3-amino-N-(3-chlorophenyl)phthalimide | H₂N—C₆H₄—NHOC—(phthalimide-N-biphenyl) | Orange. |

EXAMPLE 182

288 parts of the dye obtained by coupling diazotized N-phenyl-3-aminophthalimide with 2-hydroxynaphthoic acid-(3) is heated for five hours at 110° to 120° with 2600 parts of o-dichlorobenzene, 260 parts of thionyl chloride and 8 parts of dimethylformamide while stirring.

After the reaction mixture has been cooled, the uniformly crystalline azo dye monocarboxylic acid chloride is isolated by suction filtration and washed with 200 parts of o-dichlorobenzene, then with 1000 parts of benzene and then with 1000 parts of cyclohexane.

After drying at 80° in vacuo, 266 parts of a red crystal powder is obtained.

*Analysis.*—Calculated: Cl=7.8%. Found: Cl=7.6%.

22.8 parts of the azo dye carboxylic acid chloride thus obtained is stirred in 500 parts of N-methylpyrrolidone-(2); then 28.5 parts of the finely powdered amine having the formula:

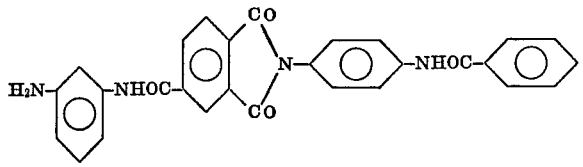

is added and the whole is heated for five hours at 140° to 150°. The sparingly soluble pigment which is thus deposited in finely crystalline form is cooled to 80°, suction filtered and washed with N-methylpyrrolidone-(2) and then with cold methanol until the filtrate which runs away is clear. The pigment can be improved by boiling it up for two hours with methanol or another solvent or stirring it at room temperature.

After drying at 80° in vacuo, 29 parts of an orange red powder is obtained which is practically insoluble in the usual solvents. Polyvinyl chloride film, sheeting and surface coatings are colored orange red shades having very good fastness to light, migration and overcoating.

The pigment has the formula:

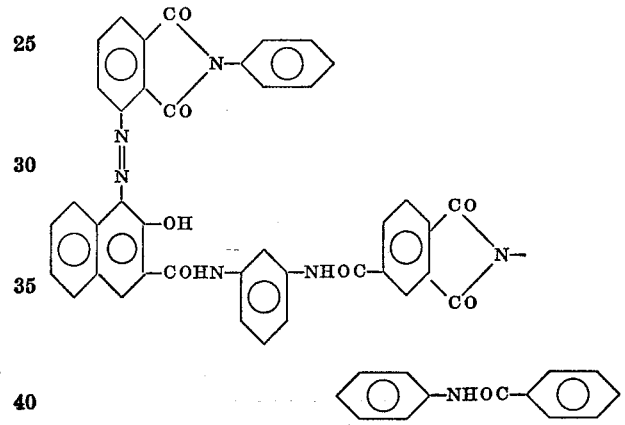

*Analysis.*—Calculated: N=10.95%. Found: N=11.0%.

Other pigments are obtained with the components in the following Table by coupling the diazo compound of an amine specified in column I, with 2-hydroxynaphthoic acid-(3) and converting the monoazo dye carboxylic acid obtained into its acid chloride which is then condensed with an amine specified in column II.

Column III indicates the shade of coatings prepared with the pigment obtained.

| Ex. No. | I | II | III |
|---|---|---|---|
| 183 | 3-amino-N-phenylphthalimide | H₂N—C₆H₄—NHOC—(phthalimide-N-phenyl) | Red. |
| 184 | Same as above | H₂N—C₆H₄—NHOC—(phthalimide-NH) | Bluish red. |
| 185 | ...do... | H₂N—(2-Cl-C₆H₃)—NHOC—(phthalimide-N-phenyl-COOCH₃) | Red. |

TABLE—Continued

| Ex. No. | I | II | III |
|---|---|---|---|
| 186 | Same as Example 183 | (structure: H₂N–C₆H₃(Cl)–NHOC–C₆H₄–(CO)₂N–C₆H₃(Cl)₂) | Red. |
| 187 | do | (structure: H₂N–C₆H₃(OCH₃)–NHOC–C₆H₄–(CO)₂N–C₆H₃(Cl)₂) | Chestnut. |
| 188 | do | (structure: H₂N–C₆H₃(OCH₃)–NHOC–C₆H₄–(CO)₂N–C₆H₃(Cl)₂) | Do. |
| 189 | do | (structure: H₂N–C₆H₄–NHOC–C₆H₄–(CO)₂N–C₆H₄–NHOC–C₆H₅) | Red. |
| 190 | do | (structure: H₂N–C₆H₄–NHOC–C₆H₄–(CO)₂N–C₆H₄–CH₃) | Red. |
| 191 | do | (structure: H₂N–C₆H₄–NHOC–C₆H₄–(CO)₂N–C₆H₃(CH₃)(OCH₃)) | Yellowish red. |
| 192 | do | (structure: H₂N–C₆H₄–NHOC–C₆H₄–(CO)₂N–C₆H₄–CH₃) | Red. |
| 193 | do | (structure: H₂N–C₆H₄–NHOC–C₆H₄–(CO)₂N–C₆H₄–CN) | Chestnut. |
| 194 | do | (structure: H₂N–C₆H₄–NHOC–C₆H₄–(CO)₂N–C₆H₃(Cl)(CH₃)) | Red. |
| 195 | do | (structure: H₂N–C₆H₄–NHOC–C₆H₄–(CO)₂N–C₆H₃(Cl)(CH₃)) | Orange. |
| 196 | do | (structure: H₂N–C₆H₄–NHOC–C₆H₄–(CO)₂N–phthalide) | Red. |
| 197 | do | (structure: H₃O–C₆H₃(NH₂)–NHOC–C₆H₄–(CO)₂N–C₆H₃(Cl)₂) | Red. |

| Ex. No. | I | II | III |
|---|---|---|---|
| 198 | Same as Example 183 | H₂N–⌬–NHOC–⌬–(CO)₂N–⌬–Cl (2-Cl) | Red. |
| 199 | do | H₂N–⌬(CH₃)–NHOC–⌬–(CO)₂N–⌬–Cl₃ (2,4,5-Cl₃) | Red. |
| 200 | do | H₂N–⌬–NHOC–⌬–(CO)₂N–⌬(CH₃, Cl) | Red. |
| 201 | do | H₂N–⌬–NHOC–⌬–(CO)₂N–⌬–Cl₂ (3,4-Cl₂) | Red. |
| 202 | do | H₂N–⌬–NHOC–⌬–(CO)₂N–⌬–Cl (4-Cl) | Red. |
| 203 | do | H₂N–⌬(CH₃)–NHOC–⌬–(CO)₂N–⌬–COOCH₃ | Yellowish |
| 204 | do | H₂N–⌬(H₃C)–NHOC–⌬–(CO)₂N–⌬–COOCH₃ | Do. |
| 205 | do | H₂N–⌬(H₃C)–NHOC–⌬–(CO)₂N–⌬–OCH₃ | Orange. |
| 206 | do | H₂N–⌬(OCH₃)–NHOC–⌬–(CO)₂N–⌬–OCH₃ | Brown. |
| 207 | do | H₂N–⌬–NHOC–⌬–(CO)₂N–⌬–Cl (3-Cl) | Red. |

| Ex. No. | I | II | III |
|---|---|---|---|
| 208 | Same as Example 183 | H₂N—⟨⟩(OCH₃)—NHOC—⟨⟩(CO)₂N—⟨⟩—COOCH₃ | Brown. |
| 209 | do | H₂N—⟨⟩—NHOC—⟨⟩(CO)₂N—⟨⟩—Cl | Red. |
| 210 | do | H₂N—⟨⟩—NHCO—⟨⟩(CO)₂N—⟨⟩—OCH₃ | Red. |
| 211 | do | H₂N—⟨⟩—NHOC—⟨⟩(CO)₂N—⟨⟩(Cl)—OCH₃ | Red. |
| 212 | do | H₂N—⟨⟩—NHOC—⟨⟩(CO)₂N—⟨⟩(CH₃)—COH₃ | Bluish red |
| 213 | do | H₂N—⟨⟩(CN)—NHOC—⟨⟩(CO)₂N—⟨⟩—COOCH₃ | Red. |
| 214 | do | H₂N—⟨⟩(Cl)—NHOC—⟨⟩(CO)₂N—⟨⟩—OCH₃ | Red. |
| 215 | do | H₂N—⟨⟩(CN)—NHOC—⟨⟩(CO)₂N—⟨⟩—OCH₃ | Red. |
| 216 | do | H₂N—⟨⟩(OCH₃)—NHOC—⟨⟩(CO)₂N—⟨⟩—OCH₃ | Chestnut. |
| 217 | do | H₂N—⟨⟩—NHOC—⟨⟩(CO)₂N—⟨⟩—OCH₃ | Red. |
| 218 | do | H₂N—⟨⟩(OCH₃)—NHOC—⟨⟩(CO)₂N—⟨⟩—⟨⟩ | Brown. |
| 219 | do | H₂N—⟨⟩(Cl)—NHOC—⟨⟩(CO)₂N—⟨⟩—OCH₃ | Red. |

TABLE—Continued

| Ex. No. | I | II | III |
|---|---|---|---|
| 220 | Same as Example 183 | H₂N–C₆H₄–NHOC–C₆H₃(CO)₂N–C₆H₄–CH₃ | Red. |
| 221 | do | H₂N–C₆H₄–NHOC–C₆H₃(CO)₂N–C₆H₃(Cl)(CF₃) | Red. |
| 222 | do | H₂N–C₆H₄–NHOC–C₆H₃(CO)₂N–C₆H₄–Br | Red. |
| 223 | do | H₂N–C₆H₄–NHOC–C₆H₃(CO)₂N–C₆H₄–Br (o-Br) | Red. |
| 224 | do | H₂N–C₆H₄(m)–NHOC–C₆H₃(CO)₂N–C₆H₄–Br | Red. |
| 225 | do | H₂N–C₆H₄–NHOC–C₆H₃(CO)₂N–C₆H₄–CF₃ | Red. |
| 226 | do | H₂N–C₆H₄(m)–NHOC–C₆H₃(CO)₂N–C₆H₄–CF₃ | Red. |
| 227 | do | H₂N–C₆H₃(Cl)–NHOC–C₆H₃(CO)₂N–C₆H₃(Cl)(Cl) | Red. |
| 228 | do | H₂N–C₆H₄–NHOC–C₆H₃(CO)₂N–C₆H₃(Cl)(Cl) | Red. |
| 229 | do | H₂N–C₆H₄(m)–NHOC–C₆H₃(CO)₂N–C₆H₂(CH₃)(Cl)(OCH₃) | Orange. |
| 230 | do | H₂N–C₆H₄–NHOC–C₆H₃(CO)₂N–C₆H₂(CH₃)(Cl)(OCH₃) | Red. |
| 231 | do | H₂N–C₆H₄–NHOC–C₆H₃(CO)₂N–C₆H₃(Cl)(CH₃) | Red. |

TABLE—Continued

| Ex. No. | I | II | III |
|---|---|---|---|
| 232 | Same as Example 183 | H₂N–C₆H₄–NHOC–[phthalimide]–N(2,3-dimethylphenyl) | Red. |
| 233 | do | H₂N–C₆H₄(m)–NHOC–[phthalimide]–N(2,3-dimethylphenyl) | Orange. |
| 234 | do | H₂N–C₆H₄–NHOC–[phthalimide]–N(2,3-dichlorophenyl) | Red. |
| 235 | do | H₂N–C₆H₄–NHOC–[phthalimide]–N(2,4-dimethylphenyl) | Red. |
| 236 | do | H₂N–C₆H₄(m)–NHOC–[phthalimide]–N(3,4-dimethylphenyl) | Yellowish red. |
| 237 | do | H₂N–C₆H₄–NHOC–[phthalimide]–N–CH₃ | Red. |
| 238 | do | H₂N–C₆H₄(m)–NHOC–[phthalimide]–N–phenyl–N–[phthalimide] | Yellow. |
| 239 | do | H₂N–C₆H₄(m)–NHOC–[phthalimide]–N–CH₃ | Orange. |
| 240 | do | H₂N–C₆H₄–NHOC–[phthalimide]–N(2,4,5-trimethylphenyl) | Red. |
| 241 | do | H₂N–C₆H₄–NHOC–[phthalimide]–N(2-ethoxy-5-methylphenyl) | Red. |
| 242 | do | H₂N–C₆H₄(m)–NHOC–[phthalimide]–N(2-ethoxy-5-methylphenyl) | Red. |

| Ex. No. | I | II | III |
|---|---|---|---|
| 243 | Same as Example 183 | 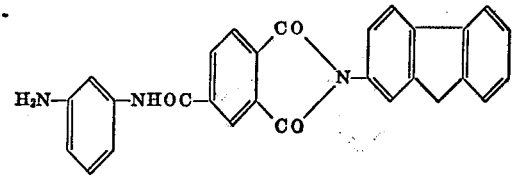 | Red. |
| 244 | do | 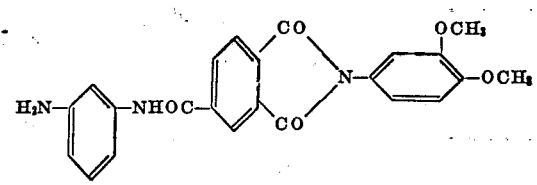 | Red. |
| 245 | do | 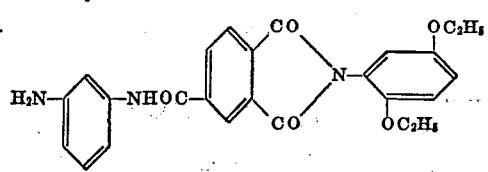 | Red. |
| 246 | do | 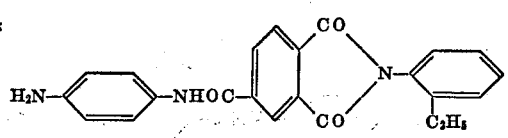 | Red₂ |
| 247 | do | 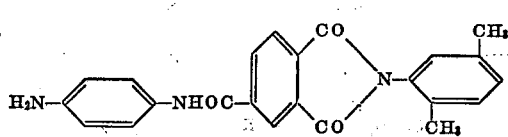 | Red₂ |
| 248 | do | 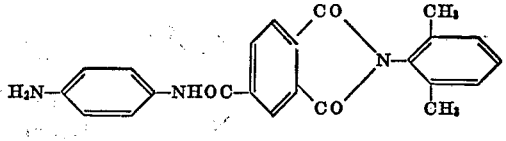 | Brown red₂ |
| 249 | do | 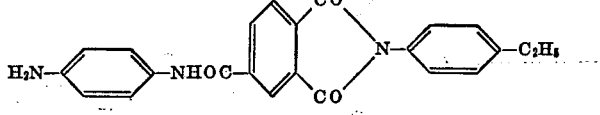 | Red. |
| 250 | do | 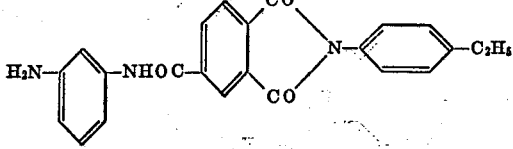 | Yellowish red. |
| 251 | do | 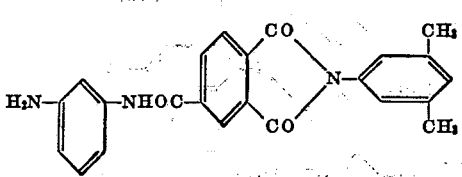 | Red. |
| 252 | do | 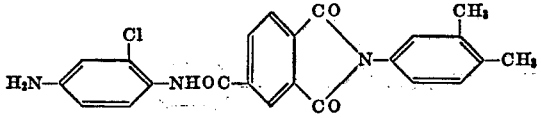 | Red₂ |
| 253 | do | 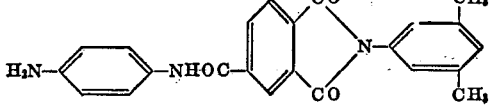 | Red₂ |

TABLE—Continued

| Ex. No. | I | II | III |
|---|---|---|---|
| 254 | Same as Example 183 | H₂N–C₆H₄–NHOC–[phthalimide]–N–C₆H₃(Cl)(OCOCH₃) | Red. |
| 255 | do | H₂N–C₆H₄–NHOC–[phthalimide]–N–C₆H₃(Cl)(OCOCH₃) | Red. |
| 256 | do | H₂N–C₆H₄–NHOC–[phthalimide]–N–C₆H₃(Cl)(OSO₂–C₆H₅) | Red. |
| 257 | do | H₂N–C₆H₃(Cl)–NHOC–[phthalimide]–N–C₆H₄(OCOCH₃) | Red. |
| 258 | do | H₂N–C₆H₄–NHOC–[phthalimide]–N–C₆H₄–OCOCH₃ | Red. |
| 259 | do | H₂N–C₆H₄–NHOC–[phthalimide]–N–C₆H₃(Cl)(SO₂CH₃) | Red. |
| 260 | do | H₂N–C₆H₄–NHOC–[phthalimide]–N–C₆H₄–SO₂CH₃ | Red. |
| 261 | do | H₂N–C₆H₄–NHOC–[phthalimide]–N–C₆H₃(CH₃)(SO₂CH₃) | Red. |
| 262 | do | H₂N–C₆H₃(Cl)–NHOC–C₆H₃(Cl)(Cl) | Red. |
| 263 | do | H₂N–C₆H₄–[phthalimide]–N–C₆H₃(Cl)(Cl) | Chestnut. |
| 264 | do | H₂N–C₆H₄–COHN–C₆H₄–CH₃ | Yellowish red. |
| 265 | do | H₂N–C₆H₄–COHN–C₆H₅ | Red. |
| 267 | do | H₂N–C₆H₄–COHN–C₆H₄–COHN–C₆H₅ | Yellowish red. |

TABLE—Continued

| Ex. No. | I | II | III |
|---|---|---|---|
| 268 | Same as Example 183 | H₂N–C₆H₄–COHN–C₆H₄(OCH₃) (3-amino, 2'-methoxy) | Red. |
| 269 | do | H₂N–C₆H₄–COHN–C₆H₃Cl₂ (4-amino; 2',5'-dichloro) | Orange. |
| 270 | do | H₂N–C₆H₃(Cl)–COHN–C₆H₃Cl₂ (3-amino,5-chloro; 2',4'-dichloro) | Red. |
| 271 | 3-amino-N-(o-tolyl)phthalimide | H₂N–C₆H₄–NHOC–C₆H₄–(CO)₂N–C₆H₅ | Red. |
| 272 | Same as above | H₂N–C₆H₄–NHOC–C₆H₄–(CO)₂N–C₆H₃Cl₂ (2',5'-dichloro) | Red. |
| 273 | do | H₂N–C₆H₃(Cl)–NHOC–C₆H₃Cl₂ | Red. |
| 274 | do | H₂N–C₆H₄–NHOC–C₆H₄–(CO)₂N–C₆H₄(OCH₃) | Red. |
| 275 | do | H₂N–C₆H₄–CONH–C₆H₃Cl₂ (2',4'-dichloro) | Yellowish red. |
| 276 | 3-amino-N-(p-tolyl)phthalimide | H₂N–C₆H₄–NHOC–C₆H₄–(CO)₂N–C₆H₃Cl₂ | Red. |
| 277 | Same as above | H₂N–C₆H₄–(CO)₂N–C₆H₃Cl₂ | Bluish red. |
| 278 | do | H₂N–C₆H₃(Cl)–NHOC–C₆H₃Cl₂ | Red. |
| 279 | do | H₂N–C₆H₄–NHOC–C₆H₃Cl₂ | Red. |
| 280 | do | H₂N–C₆H₄–COHN–C₆H₃Cl₂ (2',4'-dichloro) | Orange. |
| 281 | 3-amino-N-(p-methoxyphenyl)phthalimide | H₂N–C₆H₄–NHOC–C₆H₄–(CO)₂N–C₆H₃Cl₂ | Red. |

TABLE—Continued

| Ex. No. | I | II | III |
|---|---|---|---|
| 282 | Same as Example 281 |  | Red. |
| 283 | do | 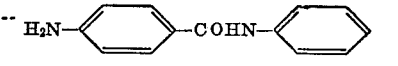 | Bluish red. |
| 284 | do | 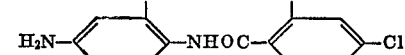 | Red. |

EXAMPLE 1

Use in coating compositions 5 parts of the dye obtained according to Example 119 and 95 parts of a baking lacquer mixture (for example 70% of coconut alkyd resin, 60% in xylene, and 30% of melamine resin, about 55% in a mixture of butanol and xylene) are ground in an attrition mill. After application to a substrate and baking for thirty minutes at 120° brilliant full shade coatings are obtained with very good fastness to light and overcoating.

Brilliant white brightening effects are achieved by adding, for example, $TiO_2$.

Similar coatings in the specified shades are obtained by using the pigments described in the other Examples.

EXAMPLE 2

Use in plastics

Transparent colorations of polystyrene having very good fastness to light are obtained by incorporating 0.05 part of the dye obtained according to Example 1 in 100 parts of polystyrene. Coloration is carried out at 190° to 220° in an extruder.

Polystyrene colorations having good hiding power are obtained analogously by incorporating 0.2 part of the abovementioned dye and 1.0 part of $TiO_2$ into 100 parts of polystyrene.

Similar results are obtained when the pigments from the other Examples are used.

EXAMPLE 3

Use in printing inks 5 parts of the dye obtained according to Example 26, 30 to 40 parts of resin (for example rosin modified with phenol-formaldehyde) and 65 to 55 parts of toluene are intimately mixed in a dispersing unit. A toluene intaglio printing ink having excellent light fastness and outstanding brilliance is obtained.

When the pigments from the other Examples are used, printing inks having similar properties and the specified shades are obtained.

We claim:

1. An azo pigment of the formula:

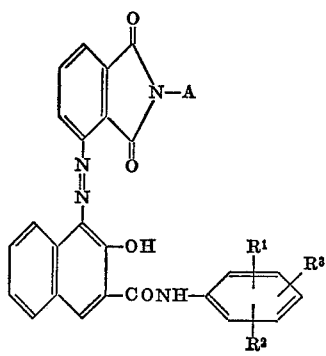

in which $R^1$ is

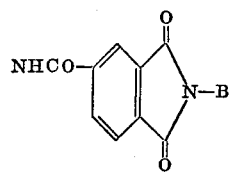

or

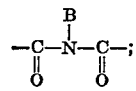

$R^2$ is hydrogen, chloro, bromo, methyl, methoxy, ethoxy, cyano, carbomethoxy, methylsulfonyl, carbamoyl, N - phenylcarbamoyl, N - chlorophenylcarbamoyl, N-methylphenylcarbamoyl, N-methoxyphenylcarbamoyl, N-dichlorophenylcarbamoyl;

$$-\overset{B}{\underset{\underset{O}{\|}}{C}}-\overset{|}{N}-\underset{\underset{O}{\|}}{C}-;$$

$R^3$ is hydrogen, chloro, methyl, methoxy or ethoxy;
$R^7$ is hydrogen, fluoro, chloro, methyl, ethyl, methoxy, ethoxy, carbomethoxy, carbamoyl, sulfamoyl, N-phenyl-sulfamoyl or cyano;
$R^8$ is hydrogen, chloro, methyl, methoxy or ethoxy;
$R^9$ is hydrogen, chloro, methyl or methoxy;
A is phenyl, or phenyl substituted by chloro, cyano, methyl, ethyl, methoxy, ethoxy, carbomethoxy or carboethoxy, naphthyl; or diphenyl; and
B is hydrogen; methyl, phenyl or phenyl substituted by chloro, bromo, methyl, ethyl, methoxy, ethoxy, phenoxy, chlorophenoxy, phenyl, benzoyl, cyano, carbomethoxy, carbamoyl, sulfamoyl, acetylamino, benzoylamino, chlorobenzoylamino, methylbenzoylamino or nitro; naphthyl; chloronaphthyl; or one of the radicals having the formula

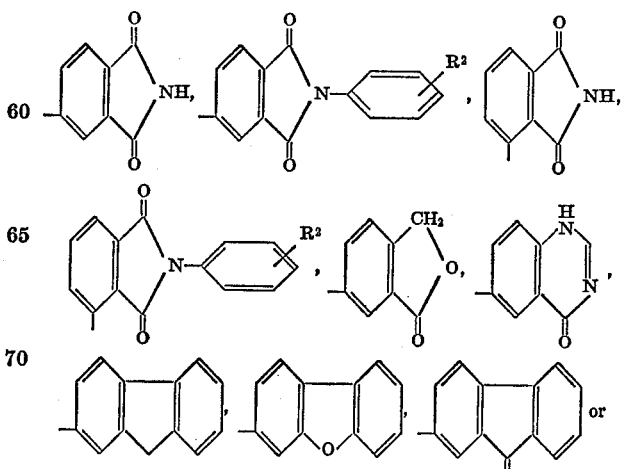

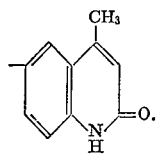

2. A dye as claimed in claim 1 of the formula:

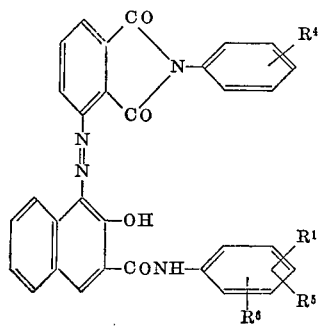

in which
R[4] denotes hydrogen, chloro, methyl, ethyl, methoxy, ethoxy or phenyl;
R[5] denotes hydrogen, chloro, cyano, methyl or methoxy;
R[6] denotes hydrogen, chloro, methyl or methoxy; and
R[1] and R[5] together may denote the radical of the formula

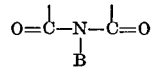

R[1] and B having the meanings given in claim 1.

3. A dye as claimed in claim 1 of the formula:

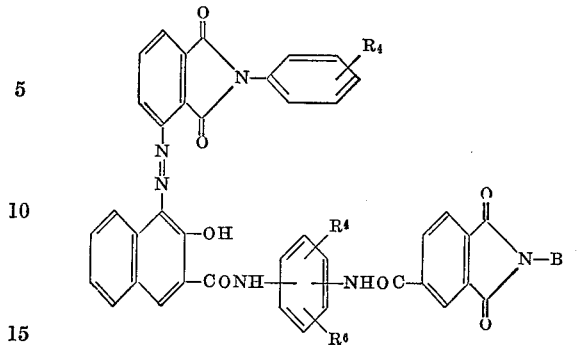

in which B, R[4], R[5] and R[6] are meanings given in claim 1.

References Cited
UNITED STATES PATENTS

| | | | |
|---|---|---|---|
| 1,758,313 | 5/1930 | Eckart et al. | 260—152 |
| 3,402,166 | 9/1968 | Heckl et al. | 260—152 |
| 3,468,872 | 9/1969 | Schefczik et al. | 260—152 |
| 3,509,122 | 4/1970 | Horstmann et al. | 260—157 |
| 3,513,153 | 5/1970 | Horstmann et al. | 260—152 |
| 3,600,374 | 8/1971 | Mory | 260—152 |
| 3,627,748 | 12/1971 | Roueche et al. | 260—152 |
| 3,634,388 | 1/1972 | Horstmann et al. | 260—152 |
| 3,644,405 | 2/1972 | Horstmann et al. | 260—156 |

FLOYD D. HIGEL, Primary Examiner

U.S. Cl. X.R.

8—4; 106—23, 288 Q, 300, 308 Q; 117—138.8 UA; 260—41 B, 41 C, 154, 155, 156, 326 D, 326 N

UNITED STATES PATENT AND TRADEMARK OFFICE
CERTIFICATE OF CORRECTION

PATENT NO. : 3,825,527
DATED : July 23, 1974
INVENTOR(S) : GUENTHER RUIDER and PETER DIMROTH It is certified that error appears in the above-identified patent and that said Letters Patent are hereby corrected as shown below:

Column 1, in the heading, insert --Claims Priority, Application German, December 4, 1970, P 20 59 708.4--

Column 2, line 61, delete "CONH$_6$C$_4$Br" and substitute --CONHC$_6$H$_4$Br--;

Column 3, line 25, delete "NHCO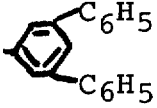,"

and substitute --NHCO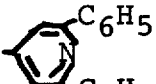,--;

Column 10, line 25, delete "H$_2$NNHOC"

and substitute --H$_2$NNHOCN--;

Column 17, Example 78, delete "CONH" and substitute --COHN--;

UNITED STATES PATENT AND TRADEMARK OFFICE
CERTIFICATE OF CORRECTION

PATENT NO. : 3,825,527
DATED : July 23, 1974
INVENTOR(S) : GUENTHER RUIDER and PETER DIMROTH Page 2

It is certified that error appears in the above-identified patent and that said Letters Patent are hereby corrected as shown below:

Column 22, Example 103, delete " 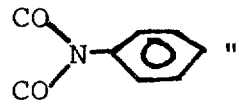 "

and substitute-- $\begin{array}{c}CO\\CO\end{array}\!\!>\!\!NH$ --;

Column 37, Example 180, delete "$OCH_3$", at the end of the formula;

Column 40, Example 186, delete " $H_2N\!\!-\!\!\bigcirc\!\!-\!\!NHOC$ " with Cl and substitute--$H_2N\!\!-\!\!\bigcirc\!\!-\!\!NHOC$--;

Column 42, Example 203, delete "Yellowish" and substitute--Yellowish Red--;

Column 42, Example 204, delete "Do." and substitute--Yellowish Red--;

Column 54, Example 271, second formula, delete "$H_2N\!\!-\!\!\bigcirc\!\!-\!\!NHOC$" and substitute--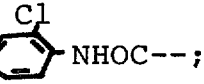--;

Column 54, Example 276, far right side insert

Signed and Sealed this twentieth Day of January 1976

[SEAL]

Attest:

RUTH C. MASON
*Attesting Officer*

C. MARSHALL DANN
*Commissioner of Patents and Trademarks*